(12) United States Patent
Johnson et al.

(10) Patent No.: US 9,097,593 B2
(45) Date of Patent: Aug. 4, 2015

(54) SPRING-BODIED DEVICE FOR IN-SITU OVERHEAT ALERT FOR EQUIPMENT

(71) Applicants: GM GLOBAL TECHNOLOGY OPERATIONS LLC, Detroit, MI (US); DYNALLOY, INC., Tustin, CA (US)

(72) Inventors: Nancy L. Johnson, Northville, MI (US); Alan L. Browne, Grosse Pointe, MI (US); Nicholas W. Pinto, IV, Ferndale, MI (US); Carol A. Terry, Fowlerville, MI (US); Roland J. Menassa, Macomb, MI (US); Jan H. Aase, Oakland Township, MI (US); Jeffrey W. Brown, Los Gatos, CA (US); Wayne Brown, Costa Mesa, CA (US); Aragorn Zolno, Whittier, CA (US); Christopher M. Barclay, Oxford, MI (US)

(73) Assignees: GM Global Technology Operations LLC, Detroit, MI (US); Dynalloy, Inc., Tustin, CA (US)

( * ) Notice: Subject to any disclaimer, the term of this patent is extended or adjusted under 35 U.S.C. 154(b) by 313 days.

(21) Appl. No.: 13/862,685

(22) Filed: Apr. 15, 2013

(65) Prior Publication Data

US 2014/0069318 A1 Mar. 13, 2014

Related U.S. Application Data

(63) Continuation-in-part of application No. 13/613,032, filed on Sep. 13, 2012.

(51) Int. Cl.
*G01K 5/70* (2006.01)
*G01K 5/48* (2006.01)

(52) U.S. Cl.
CPC . *G01K 5/70* (2013.01); *G01K 5/483* (2013.01)

(58) Field of Classification Search
CPC ........... G01K 1/02; G01K 5/48; G01K 5/483; G01K 5/50; G01K 5/52; G01K 5/54; G01K 5/56; G01K 5/58; G01K 5/60; G01K 5/62; G01K 5/64; G01K 5/68; G01K 5/70; G01K 5/72; G08B 5/02; G08B 17/02; G08B 17/04; G08B 21/187

USPC .......... 116/216, 221, 101, 102; 374/141, 142, 374/187, 188, 195, 198, 199, 200, 201, 205

See application file for complete search history.

(56) References Cited

U.S. PATENT DOCUMENTS 2,046,187 A * 6/1936 Saul ............................... 428/616
4,243,632 A * 1/1981 Ryder ............................ 422/119

(Continued)

FOREIGN PATENT DOCUMENTS

| CN | 201100848 Y | * | 8/2008 | ............... G01K 5/62 |
| GB | 2024422 A | * | 1/1980 | ............... G01K 5/48 |

(Continued)

*Primary Examiner* — R. A. Smith
(74) *Attorney, Agent, or Firm* — Reising Ethington P.C.

(57) ABSTRACT

Malfunction or failure of mechanical, electrical and electromechanical equipment, for example equipment used in manufacturing operations, is often preceded by an increase in the operating temperature of at least some portion of the equipment. Some pre-determined temperature, greater than the highest normal operating temperature of the equipment, is presumed or known to be indicative of impending equipment failure if no remedial action is taken. A resettable, temperature-sensitive device, containing a shape memory alloy actuator, pre-selected to operate at the pre-determined temperature, is disclosed. The device is placed in thermal contact with the equipment. If the equipment achieves the pre-determined temperature, the shape memory alloy actuator causes the device to display a flag or provide some other passive visual indication. Alternatively, or additionally, the actuator may trigger an electrically-powered alert including visual or audible alerts or a wireless communication.

26 Claims, 7 Drawing Sheets

(56) References Cited

U.S. PATENT DOCUMENTS

| | | | |
|---|---|---|---|
| 4,251,719 A * | 2/1981 | Ryder | 219/521 |
| 4,276,776 A * | 7/1981 | Lapeyre | 374/143 |
| 6,422,171 B1 * | 7/2002 | Betts | 116/221 |
| 6,612,739 B2 | 9/2003 | Shahinpoor | |
| 2005/0199845 A1 * | 9/2005 | Jones et al. | 251/129.06 |
| 2008/0145204 A1 * | 6/2008 | Clark et al. | 415/48 |

FOREIGN PATENT DOCUMENTS

| | | | | |
|---|---|---|---|---|
| GB | 2120788 A | * | 12/1983 | G01K 11/00 |
| JP | 2000002592 A | * | 1/2000 | G01K 5/62 |
| KR | 2010006472 U | * | 6/2010 | G01K 5/62 |
| SU | 1804772 A1 | * | 3/1993 | G01K 5/48 |
| WO | WO 9417379 A1 | * | 8/1994 | G01K 5/48 |

* cited by examiner

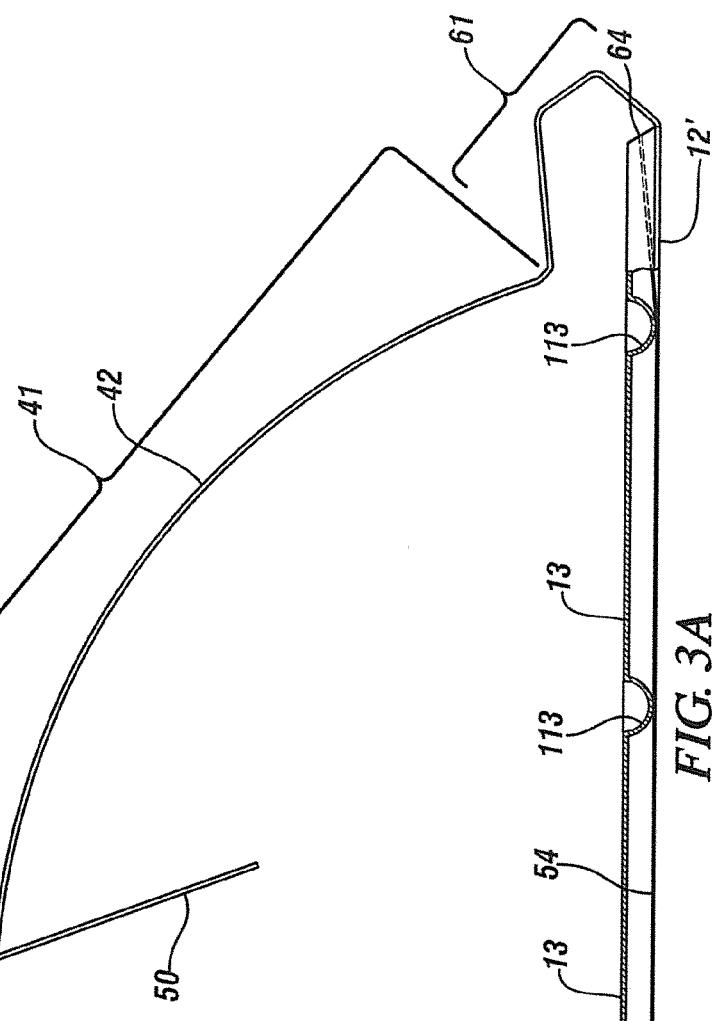
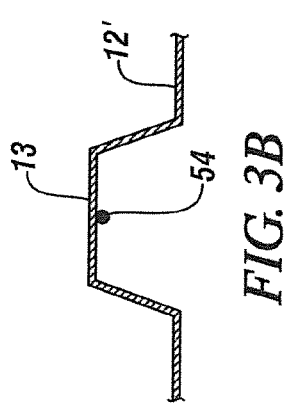
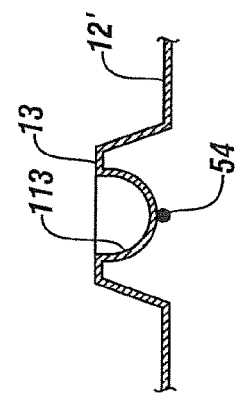
FIG. 3A
FIG. 3B
FIG. 3C

US 9,097,593 B2

SPRING-BODIED DEVICE FOR IN-SITU OVERHEAT ALERT FOR EQUIPMENT

RELATED APPLICATIONS

This patent application is a continuation-in-part of co-pending U.S. patent application Ser. No. 13/613,032, entitled "IN-SITU OVERHEAT ALERT FOR EQUIPMENT" filed on Sep. 13, 2012, the entire disclosure of which is incorporated herein by reference.

TECHNICAL FIELD

This disclosure pertains to devices adapted to fit on equipment, such as is used, for example, in manufacturing operations, each fitted-device serving to give notice of overheating of the machine to which it is attached or thermally connected. More specifically, this disclosure pertains to devices comprising a flexible sheet metal spring body and shape memory alloy wires which physically transform at a predetermined machine-overheat temperature, and in transforming, are so arranged as to release a visible overheat flag or sign. The release of the visible overheat sign can be further used to initiate other alerts and signals.

BACKGROUND OF THE INVENTION

Modern manufacturing operations and other operating devices use many types of equipment that are subjected to loads that cause heating in portions of the particular machine or unit. Sometimes the heating occurs in electrically powered equipment, such as electric motors, welding transformers, and welding guns. The heating may also occur in mechanical equipment such as gear boxes and machining equipment that experience frictional loading. Often the equipment is used in circumstances that make maximum use of its design capabilities and may result in substantial heat generation within a particular heavily loaded, manufacturing unit. Further, the equipment may be expected to operate with minimal operator attention or oversight.

It may be desired to monitor such machine temperatures and to determine if, or when, some portion of the equipment reaches a temperature that indicates that it may be overheating, a condition which is likely to be harmful to its continued operation unless some condition-ameliorating is undertaken.

SUMMARY OF THE INVENTION

Most components, machines and equipment, for example bearings, machine tools, conveyors, welding transformers, robots and the like, heat up when in use. In normal use and operation, a properly-functioning component or equipment will attain a reasonably stable and suitable operating temperature. In some equipment, particularly equipment like a weld transform which see intermittent use or a motor operating under variable load, this 'stable' temperature may exhibit short-term variations superimposed on a more or less constant base temperature. Under abnormal operating conditions or when the equipment has undergone excessive wear, its temperature may exceed its suitable operating temperature range so that its temperature exceeds what would be considered a high normal temperature. Such an overtemperature event may pose a risk of damage to the equipment. It is therefore preferred that such overtemperature events, even if transitory, be detected so that their cause may be investigated and remedial action taken.

An overheat detection device is provided which preferably comprises a unitary, flexible, sheet metal body member that is shaped with multiple bends into a configuration in which it can conform to and rest on a machine surface in a non-overheat storage position, and yet be released from the storage position by the action of a shape memory alloy wire so that the body can spring into a machine overheat alarm-giving position. The sheet metal body member may be formed from a very thin, generally rectangular strip of metal as a primary workpiece. A series of cross-wise bends are made in the initial rectangular strip to form a base segment, a hinge segment at one end of the base segment, and an arcuate segment extending from the hinge segment in a direction back over the base segment with the arc extending away from the base segment. A post segment is bent upwardly from the base segment. The arcuate segment comprises a visual overheat-warning feature, generally a flag-member, either as a separate element suitably attached to the arcuate segment or a coating or sticker directly applied to the arcuate segment. Optionally, supplementary stickers or coatings may be applied to other regions of the body, such as the base segment, which may be exposed to view when the arcuate segment is in its alarm-giving position. In many embodiments of the invention, a tab on the free end of the arcuate segment may be inserted into a slot on the post segment to hold the body member in its storage position.

The ends of one or more shape memory alloy wires are attached to the thus-shaped metal body in a location, which may include a housing or casing containing the machine, to sense overheating of a machine on which the base segment of the body is placed. The SMA wire is composed and prepared to shorten its length when it is thus heated. The shortening of the SMA wire is used to release the tab or other closure device on the unitary metal body and to permit it to spring to its overheat warning position with its flag-member in a visually prominent display position. The flag-member may, for example, be brightly colored or it may be a brightly colored warning flag.

In a particular embodiment the device will comprise a unitary, multi-segment, flexible sheet metal member, with an attached SMA wire ranging from about 75 micrometers to about 200 micrometers in diameter. The sheet metal or foil will generally have a thickness of between 200 and 800 micrometers in thickness and be in a suitable spring temper. The spring temper may result from heat treatment, cold work or some combination of the two. In a particular embodiment the sheet metal may be half-hard stainless steel alloy 304. The sheet metal member is formed into segments by introducing multiple bends at suitable locations in a suitable length of sheet or strip with generally square cut ends. The sheet may be of uniform width or may, have a wider region corresponding to the base segment, described below. The bends extend across the width of the strip and are oriented generally parallel to the sheet ends. Typically a small bend radius is employed and sufficient overbend to achieve the desired geometry after springback. As stated, the bends serve to divide the strip into four major elements; a post segment, a base segment and an arcuate segment, and a hinge portion connecting the arcuate segment to the base segment.

The base segment is generally rectangular and has two opposing sides and two opposing ends. The base section is disposed between, and attached at one end to the post segment and, at an opposing end to the arcuate segment by means of the hinge portion. At least the arcuate segment carries a flag-member which serves to provide visual notice of machine overheating. In a preferred embodiment the base segment may also carry a flag member. The flag-member may be a coating, such as paint, or an adhesive or a separate compliant or flexible member. Typically a coating or sticker may be applied to the arcuate or base segments while a separate flag-member may be attached to the arcuate segment.

The hinge portion and the arcuate segment are intended to cooperatively flex and elastically deform so that they may adopt at least two positions: a first position in which the hinge portion and arcuate segment are so arranged as to conceal the flag-member from view; and a second position in which the flag-member is clearly visible. The width of the base section may be equal to the width of the post and arcuate segments but in some embodiments the base section may be wider and extend laterally beyond the width of the post and arcuate segments to provide additional stiffness to and/or support for the device or additional equipment attachment surface. The additional attachment surface may incorporate stamped or bent ridges or like features bent upward from the plane of the base segment. These upswept features serve to add stiffness to the base segment and shield the arcuate segment from environmental influences such as air currents, weld spatter, lubricant spray and the like. Where the device is to be bent for placement on a curved surface of a machine the additional attachment surface may be lanced or partially slit to selectively reduce stiffness along the curvature of the surface. The post and arcuate segments of the unitary body are attached to opposing ends of the base section. The post segment is the shortest of the three segments and is generally upstanding with a slot extending parallel to the cut edge of the sheet. The arcuate segment, substantially equal in length to the base segment is attached, at one end, to the base at the flexible hinge which acts as a torsion spring and serves to rotate the arcuate segment. The arcuate segment terminates at a second end with an extending tab sized and adapted for engagement with the slot of the post segment. As described further below, the torsional spring behavior of the hinge and the flexibility of the arcuate segment enable releaseable engagement of the tab of the arcuate segment and the slot of the post segment.

The arcuate segment includes a bowed or arcuate portion arranged concave down, terminating at each end at a bend. The arcuate segment also includes one short unbent portion and a bent-up tab attached to one end of the arcuate portion. The other end of the arcuate portion is connected to an unbent portion of the flexible hinge. An elongated, linear shape memory alloy (SMA) member or wire is attached at one end to the unbent portion of the arcuate segment and at its other end to the unbent portion of the flexible hinge abutting the arcuate portion. The elongated SMA element extends across and bridges the arcuate portion supported on the bends defining the extent of the arcuate portion. The SMA element may be any of a wire, tape, braid, cable, or the like, but will typically be a thin gage wire or tape as they provide superior conductive heat transfer from the flat base segment to the SMA element. For convenience the term 'wire' will be used generically in the remainder of this specification with the understanding that it will encompass the other elongated SMA element forms noted above. The wire is secured to the arcuate portion under light tension, so that it forms a chord of the portion of the circle described by the bowed or arcuate portion. In an embodiment the wire has crimped brass tabs attached to its ends. These tabs are shaped to fit through a shaped opening in a body when suitably oriented but to engage the sides of the opening and mechanically interfere with the body when in at least a second orientation. Thus the SMA wire may be secured by placing the tabs through pierced holes in the sheet so that the tabs and sheet material engage to secure the SMA wire.

The arcuate segment may, due to the spring character of the sheet and its flexibility, adopt one of two positions relevant to the operation of the device. In its relaxed position, that is in the absence of externally applied loads, the arcuate section is generally upstanding while partially overlying the base segment. Preferably the flag-member is thereby positioned at an angle of no more than 35° to the vertical and presents itself clearly to an observer sighting over the post segment. At least a portion of the upper surface of the base segment should also be in view of the same observer.

Application of light pressure, for example finger pressure, to the arcuate segment rotates the arcuate segment about the flexible hinge. Under sufficient pressure the bends defining the ends of the arcuate portion may contact the base and the tab of the arcuate segment may engage the slot of the post segment. Such engagement may be facilitated by application of light lateral pressure to the post section to rotate the post section about its bend permitting the tab to clear the post segment. When the tab is aligned with the slot the pressure applied to the post segment may be released allowing the tab to engage the slot and maintaining the arcuate section under tension, in a latched, closed configuration in which the actuate segment overlies the base segment.

The engagement should be robust enough to withstand levels of shock and vibration as may be encountered in a manufacturing environment and should tolerate g-loadings of between 10 g to 100 g so that the device may be applied to devices, like industrial robots, which are subject to such accelerations.

In its latched configuration the arcuate portion is so arranged that its bounding bends contact the base. Because the lightly-tensioned SMA wire extends from bend to bend, the SMA wire will also lie in contact with the base and enable good thermal communication, by conduction, from base to SMA wire. Preferably the SMA wire may be isolated from extraneous environmental influences such as air currents weld spatter or other airborne debris, or lubricant spray by appropriate shields or coverings.

SMA alloys transform from a low modulus, relatively soft and readily deformed martensite phase to a strong, deformation-resistant austenite phase over a narrow and specific temperature range. Remarkably, provided the maximum deformation is limited to no more that about 8% strain the deformation of the alloy in its martensite phase is reversible and can be recovered on transforming the SMA to austenite.

Thus the SMA wire is first stretched, by a suitable amount, by the springy, elastic arcuate member during the step of latching of the device by inserting the tab of the arcuate segment into the slot of the post segment. Then, during transformation responsive to an equipment overheat event, the SMA alloy will shrink and reduce its length, while applying a force sufficient to overcome any resistance to such shrinkage and withdraw the tab from the slot.

Transformation may be pre-selected to occur over selectable temperatures ranging from −100° C. or so to about 200° C., primarily by choice of alloy system. Thus, by appropriate choice of SMA alloy, an SMA wire may be selected to transform at temperatures of between about 50° C. and 100° C. For most equipment and components, such a temperature range is representative of normal operation, but, of course, the particular temperature within this range will vary from machine to machine and the device, with appropriate choice of SMA composition may operate at any temperature where the SMA alloy undergoes transformation. Any temperature in excess of the particular operating temperature for a particular piece of equipment or machinery may represent an overtemperature event. Thus transformation of an SMA wire with a transformation temperature range selected to correspond to a temperature of slightly greater than the upper end of acceptable machine operating temperatures will signal a machine overtemperature event.

Such transformation may be detected by the overtemperature device described above. By suitable balance between the tension applied by the arcuate portion of the arcuate segment and the tension applied by the austenite as it shrinks, the radius of the arcuate portion may be adjusted. During transformation to austenite the radius will decrease. By appropriate selection of the extent of tab engagement and the length of the SMA wire the change in shape of the arcuate portion may be made sufficient to withdraw and disengage the tab from the slot in the post section. This will enable the stored torsional energy in the hinge portion to pivot the arcuate segment about the flexible hinge and expose its underside to view. For repeated use of the overtemperature device it will be important to limit the stretch imposed on the SMA wire during latching to no more than about 8% of its initial length. Thus the length of the arcuate portion, the length of the SMA wire and the length of the tab portion must be cooperatively selected to assure disengagement of the tab under overtemperature conditions while assuring continued engagement of the tab when an overtemperature condition does not exist.

As noted previously, the overtemperature device also comprises a flag-member or like visual indicator. The flag-member(s) or flag(s) are positioned so that they may be visible when the arcuate segment is in its unlatched, generally upstanding arrangement. When the arcuate segment is in its latched, base-overlying, arrangement such flags, will, by design, not be observable. To enhance their visibility the flag may be brightly or otherwise colored to contrast with and stand out from its surroundings. Since its is intended that the device signal an overheating or otherwise abnormal or undesired temperature, the flag may be red or orange or another color which is generally perceived to connote a warning or a hazard. The flag may also incorporate indicia to convey further information such as suitable responses to such a warning. The flag-member may be separate and distinct and attached to the arcuate segment at one location so that it may hang generally vertically down for easier viewing or it may be secured at two or more locations to generally conform to the shape of the arcuate segment. In some embodiments an arcuate segment mounted flag member may be stored in a compact configuration and unfurl or otherwise deploy to a larger configuration for ease of viewing. Alternatively some portion of the underside of the arcuate segment may be painted or otherwise covered with a suitable, warning-conveying coating, for example an adhesively-attached sticker. To maximize the attention-giving area of the flag-member and to make it less sensitive to viewing direction it may be preferred to apply flag material to that portion of the base which is exposed to view when the arcuate portion is released. To avoid impeding heat flow from the base to the SMA wire, the flag material on the base should be positioned to at least leave a strip of base uncovered for direct base to SMA wire conductive thermal communication.

In operation the device may be attached, by its base, to a piece of equipment or machine or its housing. Attachment may be mechanical using bolts, clips, clamps or similar to firmly secure the base to the equipment in a manner which assures good thermal communication between the equipment under evaluation and the device over at least that portion of the base section in thermal communication with the SMA wire. Additional procedures to improve the intimacy of thermal contact and maximizing conductive heat transfer from the equipment surface to the device may include careful cleaning of the equipment surface in that location and the use of high thermal conductivity grease at the interface especially in the case of mechanical attachment where an adhesive is not used. This will be particularly important where local surface irregularities including surface texture, for example texture in sand-cast components, or machining marks on the machine surface reduce the effective contact area between the equipment and device.

Alternatively the base may be adhesively bonded to the device, for example using double-sided, thermally conductive, adhesive tapes like those well known to those skilled in the electronic arts. Again, thicker, more compliant mounting tapes may be required to maintain intimate thermal contact over the entire equipment surface if significant surface irregularities or excessive roughness is noted. For convenience the device may be supplied with such tape pre-applied. The attached device may then be latched by flexing the arcuate segment so that its tab engages the slot in the post section. This configuration, with the flag or visual indicator concealed, will be maintained for as long as the machine temperature is maintained below the transformation temperature range of the SMA. The presence of the device on the machine surface is expected to disturb the temperature at that location so that appropriate relationship between the machine surface temperature with, and without, the device may be needed. Suitably the SMA transformation range will be selected to be slightly greater, say by 5° C. or so, than the maximum expected operating temperature of the equipment so that machine operations giving rise to temperatures of no more than the expected operating temperature will not actuate the device and the flag-member will remain hidden from view. Such maximum surface temperatures and operating temperature ranges may be established in any suitable manner but one commonly-employed approach is to use a suitably-calibrated, non-contacting infrared camera. Upon the occurrence of an overtemperature event the device will unlatch, enabling the hinge portion to rotate the arcuate segment and exposing the flag to view to alert an observer so that appropriate action may be taken.

For applications where an observer may not be in clear line of sight of the device or when immediate notification is desired, the device may be adapted to trigger an electronic alarm. For example the upstanding arcuate segment might break a light beam or, a magnet mounted on the arcuate segment might, when the device is in its open position with the arcuate segment generally upstanding, close a proximity switch, among others. Both of these events may be programmed to trigger visual, auditory or electronic notification of the over temperature event using one or more of, for example, flashing lights, siren or, if further connected to a computer, an e-mail alert or similar electronic notification. Such an arrangement may also facilitate the keeping of a computer-based overtemperature frequency log.

The device may be re-set and restored to its initial non-overheat configuration in which the flag is stored and out of an observer's sight, by again pressing gently down on the arcuate portion to re-engage the tab of the arcuate segment with the slot of the post segment. The SMA wire will be at a temperature less than the overheat temperature and in its readily-deformable martensite phase. Thus the elastic deformation of the arcuate segment, required for tab-slot engagement, will also serve to stretch the SMA wire to its intended length and prepare it to respond to a future overtemperature event so that the device may again operate as intended.

Other objects, advantages, and embodiments of the invention will be apparent from the following detailed descriptions of illustrative embodiments of exemplary subject in-situ over-temperature devices and the environments in which they may be used.

BRIEF DESCRIPTION OF THE DRAWINGS

In FIG. 1A the flag is shown in its deployed position and is visible; in FIG. 1B the flag is shown in stored configuration where it is hidden from view. FIG. 1C shows a sectional view of the device in its deployed configuration, analogous to FIG. 1A while FIG. 1D, analogous to FIG. 1B, shows a sectional view of the device in its stored configuration.

FIG. 3A shows, in longitudinal sectional and partial cutaway and fragmentary sectional view, a second embodiment of the device in which the SMA wire underlies the device base and is positioned in a formed channel to restrict access of air to the SMA wire and to provide protection against airborne debris. Embodiments of the formed channel are illustrated in the fragmentary, transverse sectional views of FIG. 3B which illustrates a simple channel structure and of FIG. 3C which illustrates a more complex channel structure, also shown in FIG. 3A, incorporating protrusions to enforce contact between the SMA wire and an equipment surface.

DESCRIPTION OF PREFERRED EMBODIMENTS

Figure 1A:
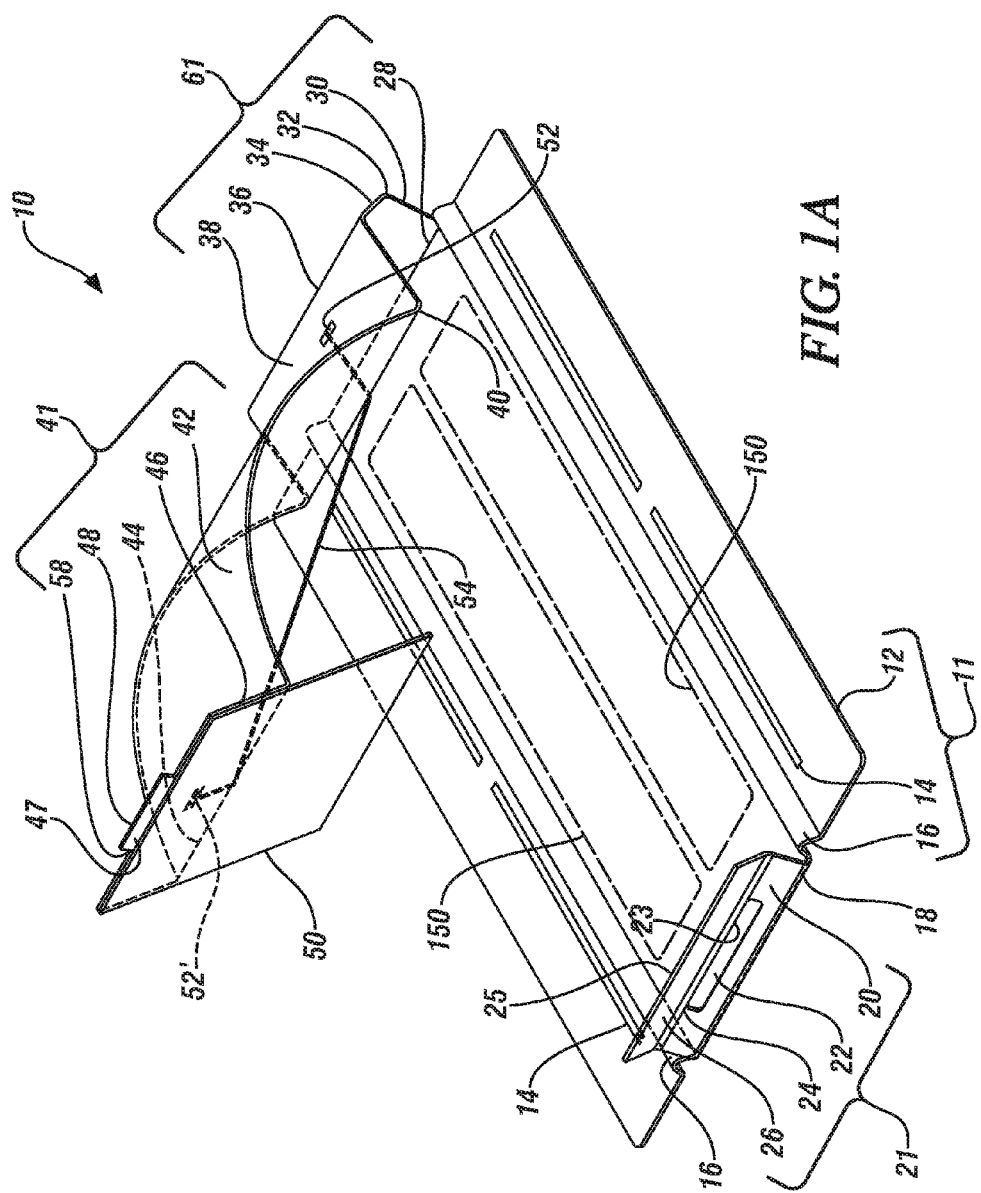
FIGS. 1A-D show, in perspective and sectional views, a device with a deployable flag-member or similar visual indicator for attachment to a surface of equipment.

The subject invention provides in-situ overheat detecting devices to protect operating machines and equipment. The device comprises a body, a shape memory alloy (SMA) wire and a visual indicator or flag-member. The body is preferably formed of a single piece of sheet metal foil or shim stock ranging in thickness from about 200 to 800 micrometers in thickness and shaped to be placed on a surface of a machine. The foil or shim stock is in spring temper so that the shaped body may be elastically deformed to temporarily store energy without undergoing permanent deformation or taking a 'set'.

Suitably the device will be placed on a machine surface which will experience a temperature increase greater than that associated with normal operation when the machine experiences overheating. The overheat detecting device uses a temperature-sensitive, shape memory alloy (SMA) wire positioned proximate to the heated machine surface. SMA materials are one of a group of active materials which may experience a change in shape or volume when heated to a pre-determined temperature range. Upon undergoing such a shape or volume change, the SMA material releases a 'flag' or similar visual member. The flag, carried by the stored elastic energy of body to a readily-visible position serves to alert an operator or passer-by to an over-temperature event.

Such a flag or visual indicator may be generally planar and of suitable shape and size, with surface coloration or other indicia. Typically the flag member may be generally rectangular in form and at least one inch in minimum dimension and up to about two inches in maximum dimension. The flag may be an independent body made of, for example, wood, metal, plastic or fabric, or may be a contrasting region of the device body, for example a portion of the device which has been painted or had reflective tape applied. To draw attention to itself, the flag will typically be of a bright color and may preferably be red or yellow since these colors are generally associated with warning signals.

Any of a variety of shape memory alloys (SMAs) may be employed. SMAs may be formulated, largely by choice of alloy composition, to undergo their shape-changing phase transformation at a pre-selected temperature (or over a narrow temperature range), and so may be tailored to undergo such transformation at a temperature suitably indicative of impending overheating, that is exhibiting temperatures that are above the range encountered during normal operation of the machine or equipment to which they are to be attached. Shape memory behavior has been observed in a large number of binary and ternary alloy systems including Ni—Ti, Cu—Zn—Al, Cu—Al—Ni, Ti—Nb, Au—Cu—Zn, Cu—Zn—Sn, Cu—Zn—Si, Ag—Cd Cu—Sn, Cu—Zn—Ga, Ni—Al, Fe—Pt, Ti—Pd—Ni, Fe—Mn—Si, Au—Zd, and Cu—Zn and phase transformation may occur over the temperature range of from between about −100° C. to about +150° C. or so, with specialized alloys transforming at up to about 250° C.

Of these many compositions, alloys of nickel and titanium in near-equi-atomic proportion, commonly known as Nitinol, enjoy the widest use, but even here minor changes in composition may induce significant differences in transformation temperature. For example changing the nickel/titanium ratio of the alloy from about 0.96 to about 1.04 may change the transformation temperature from about plus 70° C. to about minus 100° C. Further, relatively modest additions of Fe, V, Mn, Co, Cu, Zr, Nb, Mo, Pd, Ag, Hf, Ta, W, Re and Pt have been demonstrated to also influence the transformation temperature in ternary and quaternary alloys. Thus it is feasible to 'tailor' the properties of an SMA so that transformation occurs at whatever pre-selected temperature best correlates with the machine or equipment temperature which provide the most reliable indication of an overheat condition which if not corrected or ameliorated could ultimately lead to machine failure. Suitably such machine temperatures will range between about 50° C. and 100° C., a range which matches well with the capabilities of the above alloy systems in general and with nickel-titanium alloys in particular. It will be appreciated that other manufacturing activities, for example food-processing applications, may require devices operable over a higher or lower temperature range.

The shape-changing phase transformation of the SMA performs mechanical work. In the devices described below, this mechanical work may be directed to releasing a latch and thereby enabling the release and positioning of an alarm-giving flag member to indicate overheating in a manufacturing machine. The latch, once released, may only be manually re-set. Thus, an over-temperature alert, once initiated, may not be cancelled by only a subsequent reduction in temperature, but requires active operator involvement.

In a further embodiment, the device may be adapted to close a switch in an alarm-giving electrical circuit so that alternative or additional alarm means, such as a light, a siren, or a signal which initiates a computer alert, for example by e-mail or text message, may be triggered. Such an embodiment may be preferred in hazardous environments where observer access may be restricted or limited, or where there is no clear line of sight to a preferred location for mounting the device.

Because the SMA actuating elements of these overheat devices respond to equipment temperature, it is essential that effective thermal contact be promoted between at least the actuator portion of the device and the manufacturing equipment that it is protecting.

Figure 1B:
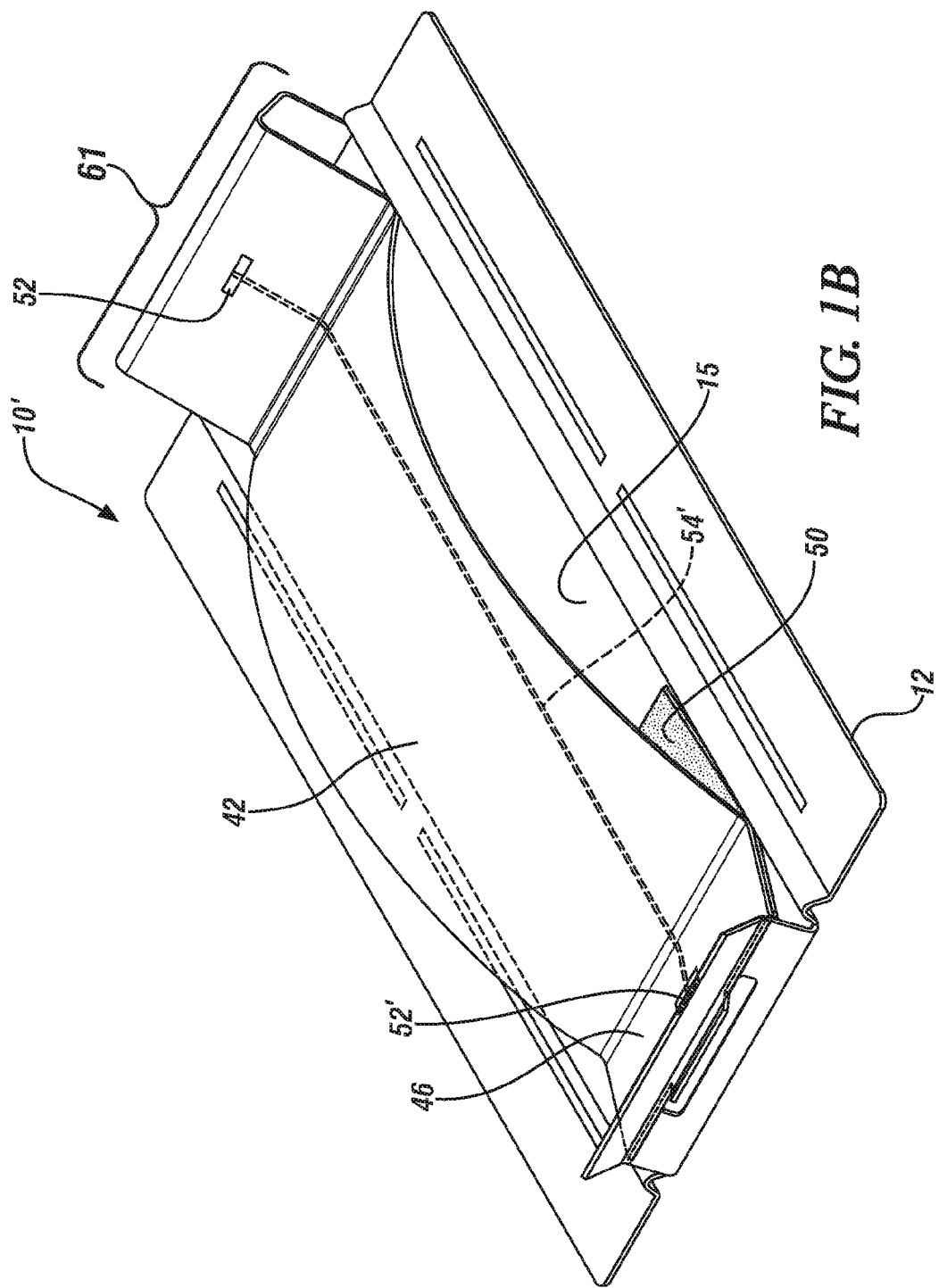
Figure 1C:
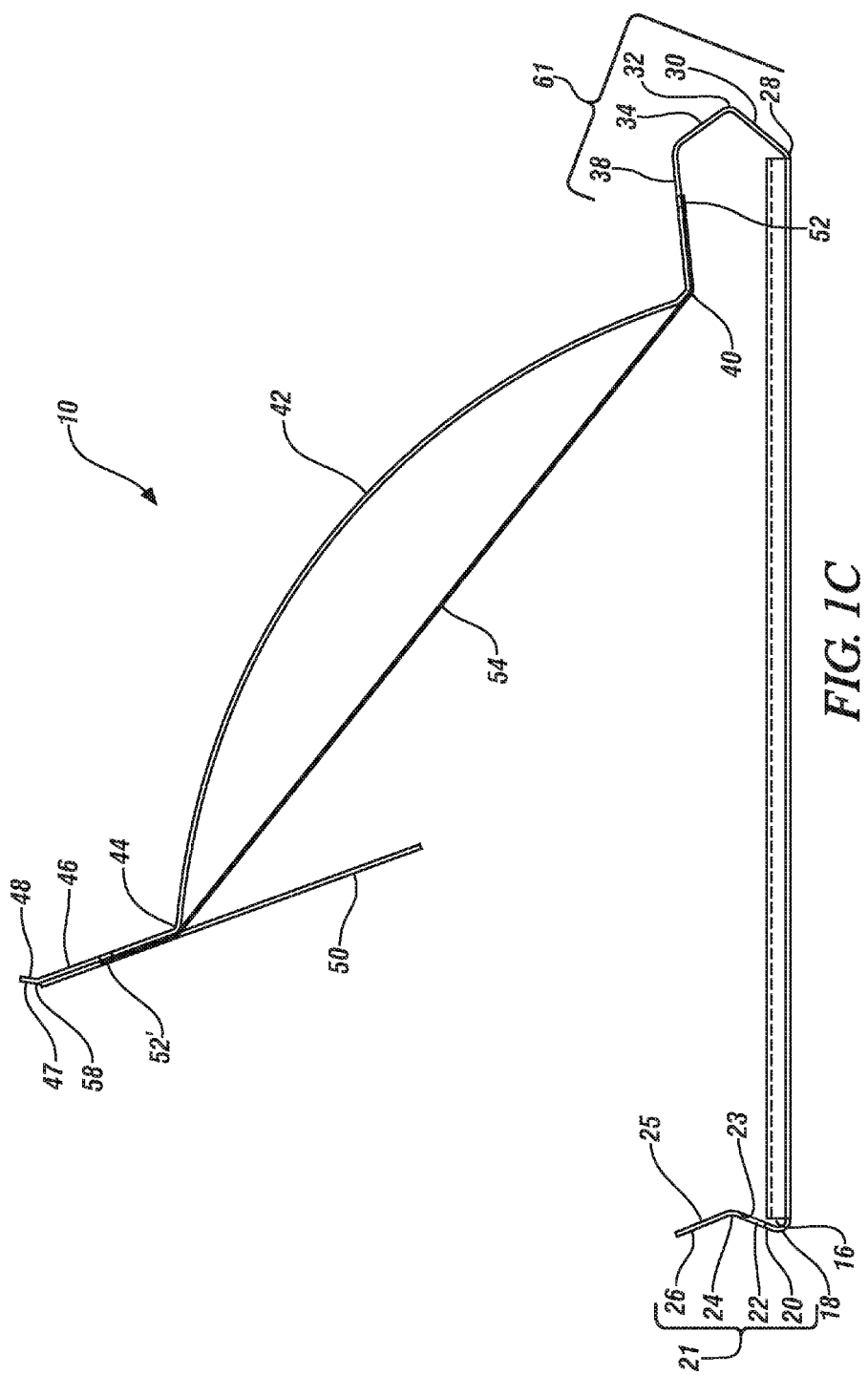
Figure 1D:
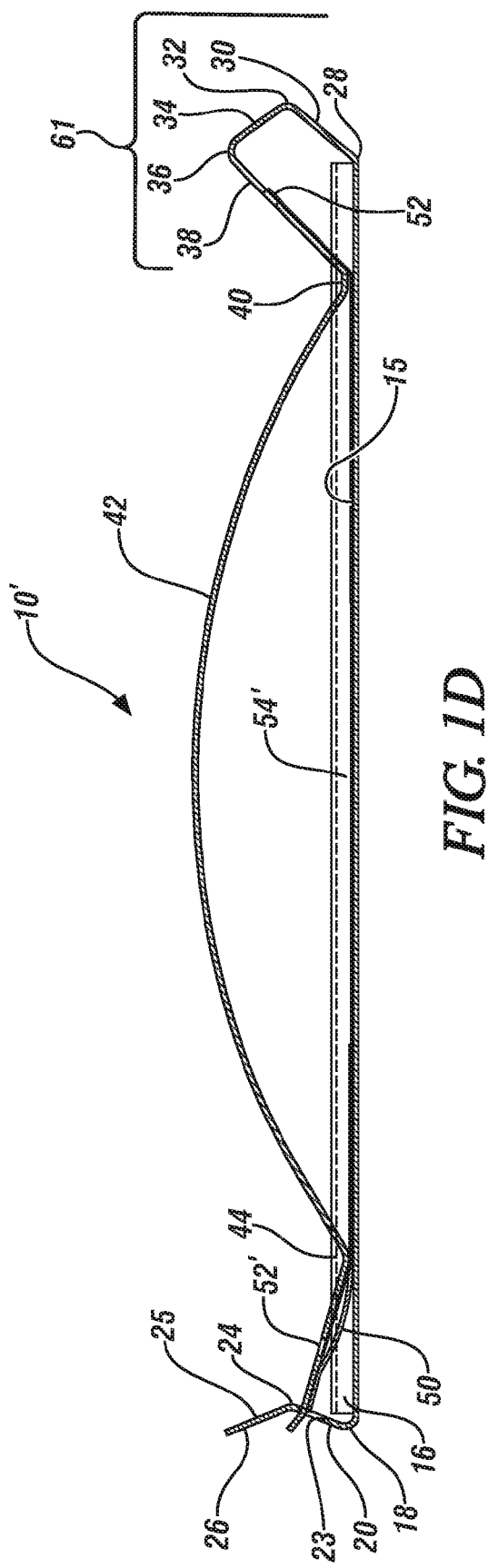

FIGS. 1A-D illustrate, an exemplary overheat detecting device shown in its flag-deployed, overtemperature-indicating configuration in FIGS. 1A and 1C and in its flag-stored configuration in FIGS. 1B and 1D. As shown, the overheat-detecting advice incorporates a unitary body comprising multiple segments and fabricated from a single sheet of material shaped by bending. It will be appreciated that a similar body may be formed as an assembly. That is, multiple sheet pieces may each be fabricated in the shape of one or more abutting segments and then joined together, for example by spot welding, to form an assembled structure capable of functioning substantially identically to the unitary body described below.

In FIG. 1A, unitary device 10, fabricated of thin 200 to 800 micrometer thick sheet or foil in a spring temper is shown. The spring temper must be such as to allow the foil to be bent to a tight radius bend, and may be achieved by heat treatment, as for example in plain (for example AISI Steel Grade1074) or alloy (for example AISI Steel Grade 5160) medium carbon steels or by cold work, as for example in a half-hard, three quarter-hard or full hard cold rolled sheet of, for example, Alloy 301 or Alloy 304 stainless steel. In lower temperature range applications phosphor bronze may also be suitable but its use is generally limited to about 100° C. or so.

The device comprises a body 10 with a base segment 11, a post segment 21, an arcuate segment 41 a hinge portion 61 and flag-member 50. Base segment 11 comprises baseplate 12 which, as depicted, is wider than overlying arcuate segment 41 and post segment 21, in part to accommodate ridges 16 and ribs 14. Ridges 16 and ribs 14 contribute stiffness to base 11 and ridges 16 further serve to limit incursion of contaminants such as lubricants or solid debris into the interior portion, that portion underlying arcuate segment 41, of baseplate 12. Ridges 16 and ribs 14 are optional and may be eliminated if it is desired to shrink the device footprint and/or where contaminant incursion and base segment stiffness are not of concern.

Post segment 21, attached to base segment 11 at bend 18, includes flat portion 20 incorporating slot 22, connected at bend 24 to flat portion 26. Post segment 21 is generally upstanding with portions 20 and 26 opposingly inclined to the vertical to form a cantilevered snap foot rotatable about bend 18 for engagement of tab 48.

Hinge portion 61 comprises a series of flat sections with intervening bends which cooperate to enable rotation of arcuate segment 41 with respect to base segment 11. Specifically hinge portion 61 includes bend 28, the line of attachment of hinge portion 61 and base segment 11, inclined portion 30, bend 32 which joins inclined portion 30 with opposingly inclined portion 34, bend 36 which is the line of attachment with near-horizontal portion 38.

Arcuate segment 41 is joined to hinge portion 61 at bend 40 and comprises arcuate portion 42, bend 44, unbent portion 46, bend 58 and upwardly-bent tab 48. Mounted to body 10 at arcuate segment 41 is SMA wire 54. In this and following drawings the SMA wire in its austenite or high temperature phase will be designated as wire 54; the SMA wire in its low temperature martensite phase will be designated SMA wire 54'. It will be appreciated that the SMA wire in the elevated position shown in FIG. 1A is out of contact with baseplate 12 and so will cool and eventually revert to its low temperature martensite form. However the figure should be interpreted as indicating the phase of the wire immediately upon actuation. SMA wire 54 is secured at locations 52 and 52' on flat portions 38 (of hinge portion 61) and 46 (of arcuate portion 41) respectively. Any suitable means of securing the SMA wire to body 10 may be employed including adhesives and spot welding as well as mechanical engagement between the SMA wire and the body. The SMA wire may be prepared for secure engagement to body 10 by application of crimped tabs at its ends if required.

SMA wire 54 is supported at bends 40 and 44 so that it forms a chord of the circle fragment defined by arcuate portion 42—see also the sectional view of FIG. 1C. Also secured to arcuate portion 41 is flag-member 50, here shown as secured to flat portion 46 and extending downwardly below bend 44. Flag-member 50 will be readily visible to an observer looking toward hinge portion 61 from the vantage point of post 21. An overtemperature alert may be made yet more noticeable by applying a supplementary notice-giving sticker or coating, such as stickers 150 shown in ghost in FIG. 1A, to some portion of base plate 12 overlain by the arcuate segment. Application of any such attention-giving feature should not compromise the conductive thermal communication between baseplate 12 and SMA wire 54', that is, SMA wire in its martensite form. Flag-member 50 is here shown as a relatively compliant panel, possibly of metal or plastic secured to portion 46, but it will be appreciated that this is merely exemplary. Other flag-member embodiments include a woven or non-woven fabric or cloth hung from either of portion 46 or hinge 44 and paint or a sticker applied directly to that surface of portion 46 to which flag-member 50 is secured. Flag member 50 can also be of substantially greater size if it may be stored in a furled or folded state but unfurl or unfold, for example under spring action, during an overtemperature event when carried to its notice-giving configuration.

Portion 46 terminates in tab 48 sized to fit into slot 22 of post segment 21 and bent at bend 58 (best seen in the sectional views of FIGS. 1C and 1D) so that bend 58 may, once tab 48 is inserted into slot 22, engage lip 23 of the slot and so resist inadvertent disengagement of tab 48 from slot 22. No such inadvertent disengagement should occur under the shock and vibration conditions typical of heavy manufacturing or under g-loads of up to 100 g so that the device may be used on equipment subject to large accelerations.

Application of downward pressure on arcuate segment 41, say at bend 44 pivots or rotates the segment about hinge portion 61 through the cooperative response of portions 30, 34 and 38 and bends 28, 32 and 36. Continued application of pressure in this way will cause surface 47, the underside of tab 48 to contact surface 25, the upwardly-facing side of portion 26 on post segment 21. The relative inclination of surfaces 47 and 25 will generate a lateral force acting generally parallel to base segment 11 which will serve to rotate post segment 21, with its cantilevered snap foot geometry, about bend 18, affording opportunity for yet further depression of arcuate segment 41 and rotation about hinge portion 61. On continued application of pressure, tab 48 will be depressed sufficiently to engage slot 22 in post segment 21, relieving the lateral loading on the post segment and allowing it to 'snap back' and so trap tab 48 in slot 22. The slight upward inclination of tab 48, relative to portion 46, resulting from bend 58 serves to engage lip 23 of slot 22 with bend 58 (FIG. 1D) and resist spontaneous extraction of tab 48 from slot 22. In this configuration flag-member 50 is hidden from view and it is in this configuration that device 10' (FIGS. 1B, 1D) may suitably be attached to a machine or other equipment in preparation for detecting an overtemperature event. In this configuration the SMA wire 54' is in its low temperature martensite phase. Preferably the device is installed on the equipment with arcuate segment 41 deployed so that any required attachment pressure can be applied to the top surface of the baseplate 12 and not to the hinge portion 61 or either or both of the arcuate 41 and post 21 segments. Once installed then the device may be latched by engaging tab 48 with slot 22.

As seen at FIGS. 1B and 1D, the hinging action of hinge portion 60, in conjunction with the general compliance and flexibility of device 10 serve to assure that bends 40 and 44 are brought into contact with surface 15 of baseplate 12. More particularly since SMA wire 54' is supported on the surface of bends 40 and 44 SMA wire 54' is held in intimate contact with surface 15 so that excellent heat transfer from base segment 11 to SMA wire 54' may be achieved.

The device configuration 10' shown in FIGS. 1B and 1D is representative of the configuration at a temperature insufficient to promote transformation of the SMA wire so that it remains in its low temperature, lower modulus, more readily deformable state. Upon attaining a temperature or temperature range at which transformation occurs, and which is preselected to indicate an overtemperature event, SMA wire 54' will seek to reduce its length and, in so doing will apply sufficient force to displace bend 44 toward bend 40, reducing the radius of arcuate portion 42 and retracting tab 48 from slot 22. As wire 54' transforms completely, tab 48 fully disengages from slot 22 enabling torsionally-tensioned hinge portion 61 to bodily rotate arcuate segment 41 to its elevated position as shown at FIG. 1A, disclosing flag 50 and optionally flag 150 to any suitably-positioned observer so that appropriate remedial action may be taken. Once such remedial action is completed, the, now-cool, device comprising SMA wire 54 in its easily-deformable martensite phase may be readily reset.

It will be appreciated that the shrinkage of the SMA wire and the geometry of the arcuate portion of the arcuate segment will interact in determining the extent of the lateral displacement of the arcuate segment. The lateral displacement must be sufficient to assure disengagement of the tab when an overtemperature condition promotes transformation of the SMA wire. But, to minimize tab disengagement when no overtemperature condition exists, due, for example, to vibrations, debris impact or other mechanical interactions as may occur in a manufacturing environment, appreciable penetration of the tab into the slot is desirable. Further, if the device is to be repeatedly used and reset as described above, the stretch applied to the SMA wire during resetting should not exceed about 8%. Thus the SMA wire length, the design of the arcuate portion and the length of the tab insertion into the slot will cooperate to render a design which reliably indicates an overtemperature condition but is resistant to operation in the absence of an overtemperature condition.

The specific implementation of the device depicted in FIGS. 1A-D has been described in some detail but it will be appreciated that the design details shown are intended to be illustrative and not limiting. For example post segment 21 may comprise only a single inclined flat portion rather than the two opposing inclined sections (20 and 22) shown. Similarly arcuate portion 42 may be extended to eliminate bend 44 or to reduce the length of portions 38 (of hinge portion 61) and/or of portion 46 while hinge portion 61 may be adapted to include more or fewer bends and flat portions. The base section may be shaped with downwardly or upwardly extending wings or supports or be shaped for more stable placement on a curved surface or may comprise lanced or slotted features to directionally reduce its stiffness for application to small radius curved cylindrical surfaces such as a motor casing. These changes and modifications may be made without detriment to the functionality and effectiveness of the device and all such detailed modifications of the device are considered to fall within the scope of the invention.

There may be occasions where immediate notification of overheating is required or preferred. Or, a device placement suited for thermal evaluation of a machine or equipment may be less than optimal for visual observation. Or the device may find application in biohazard or radiation hazard or similar areas where regular visual inspection of the device is challenging or inconvenient. Under these use scenarios the device may be used in conjunction with a sensor suited to detect the release of tab 48 from slot 22 and the resulting elevation of flag 50 to a viewing position. Suitable sensors may include a light beam and sensor so arranged that the light beam is broken by the elevated arcuate segment 42; a magnet so mounted on the arcuate segment 42 that, when the arcuate segment 42 is elevated, it closes a magnetic switch or triggers a Hall Effect sensor; and a capacitive proximity switch positioned to respond to the elevated arcuate segment 42, among many others. Once elevation of the arcuate segment 42 is detected any of the switches/sensors mentioned may be incorporated into an alarm-giving electric circuit to provide: audible warning, for example using a siren; remote visual warning, for example using a flashing high intensity strobe light; or computer-originated warnings via any combination of phone, pager, e-mail and social media among others.

Figure 2A:
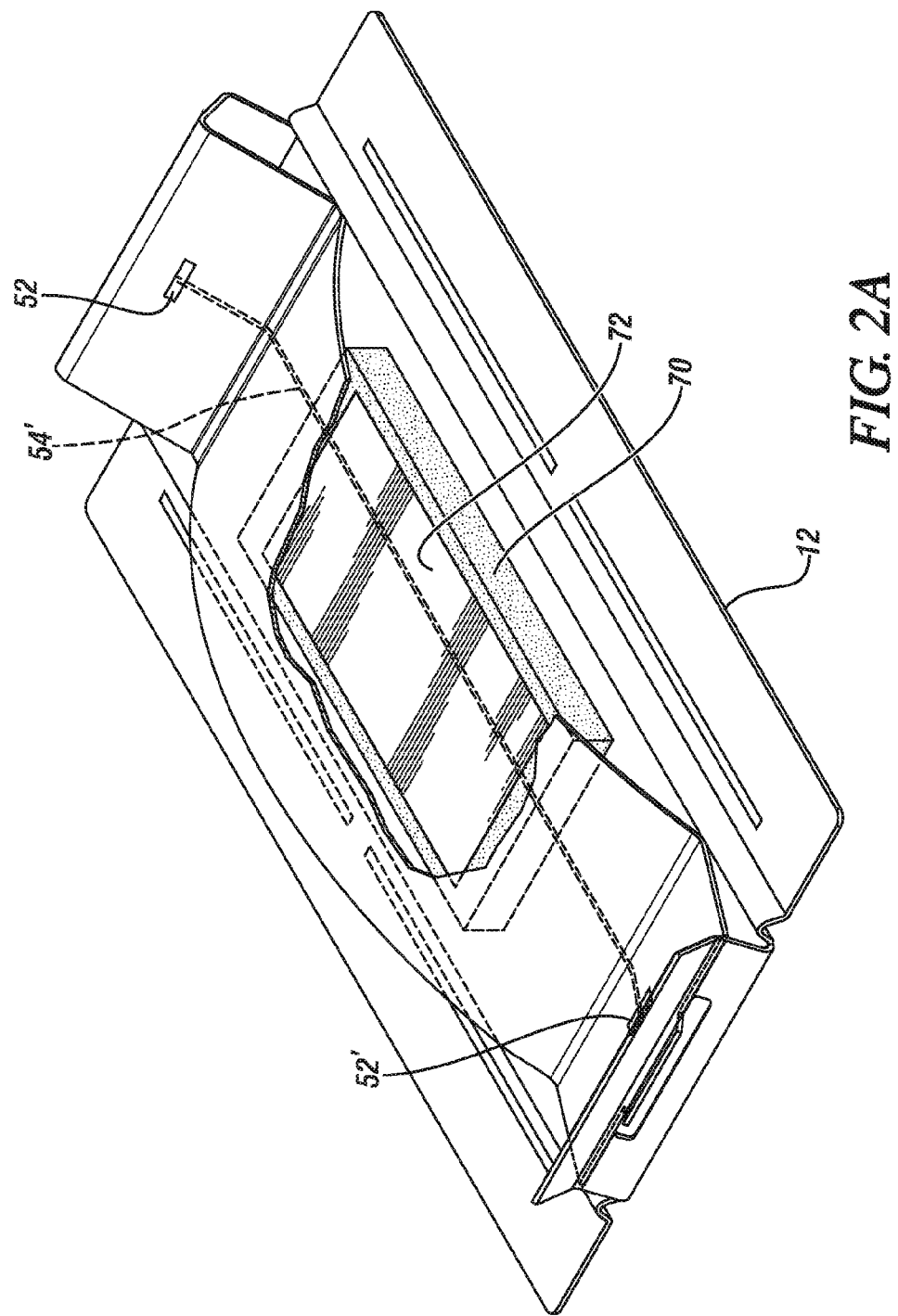
FIG. 2A shows, in perspective view, the device of FIGS. 1A-D further incorporating shield/barrier features to minimize environmental influences on the SMA wire by restricting access of air to the SMA wire and by providing protection against airborne debris.

FIG. 2A shows further refinements and embodiments of the device. In this embodiment the SMA wire is shielded to minimize the influence of environmental conditions, for example air currents arising from unforced convection or resulting from the action of vent or cooling fans. These environmental factors might otherwise affect the temperature of the SMA wire and cause its temperature to differ from that of the surface of the baseplate against which it rests. Directly overlying the SMA wire 54' is a compliant flexible covering 70 intended to exclude air currents from contact with the wire to artificially elevate or depress the wire temperature and so promote false positive or false negative indications. Suitable coverings could include non woven fabric or closed cell polymer foams. Such fabric and foams may be attached to arcuate portion 41 between the arcuate section and the SMA wire and coverage of the SMA wire along substantially its entire length without appreciably changing the mass and stiffness of the arcuate segment. Where weld spatter, molten metal ejected from a welding operation, may be problem, the foam cell covering may be covered and protected, over a portion of its length by shield of thin metal foil or shim stock 72. It is generally preferred that shield 72 be shorter than covering 70 and supported by covering 70 to avoid unduly stiffening arcuate segment 41. If such a shield is supported on arcuate portion 42 it should be attached at only one end, again to avoid unduly stiffening arcuate portion 42. If used in the absence of covering 70, shield 72 may have the form of an inverted 'Vee' to better exclude weld spatter. Under severe conditions, a covering capable of shrouding the entire device and sufficiently light not to interfere with the operation of the device and the elevation of the arcuate segment under overtemperature conditions may be used.

Figure 2B:
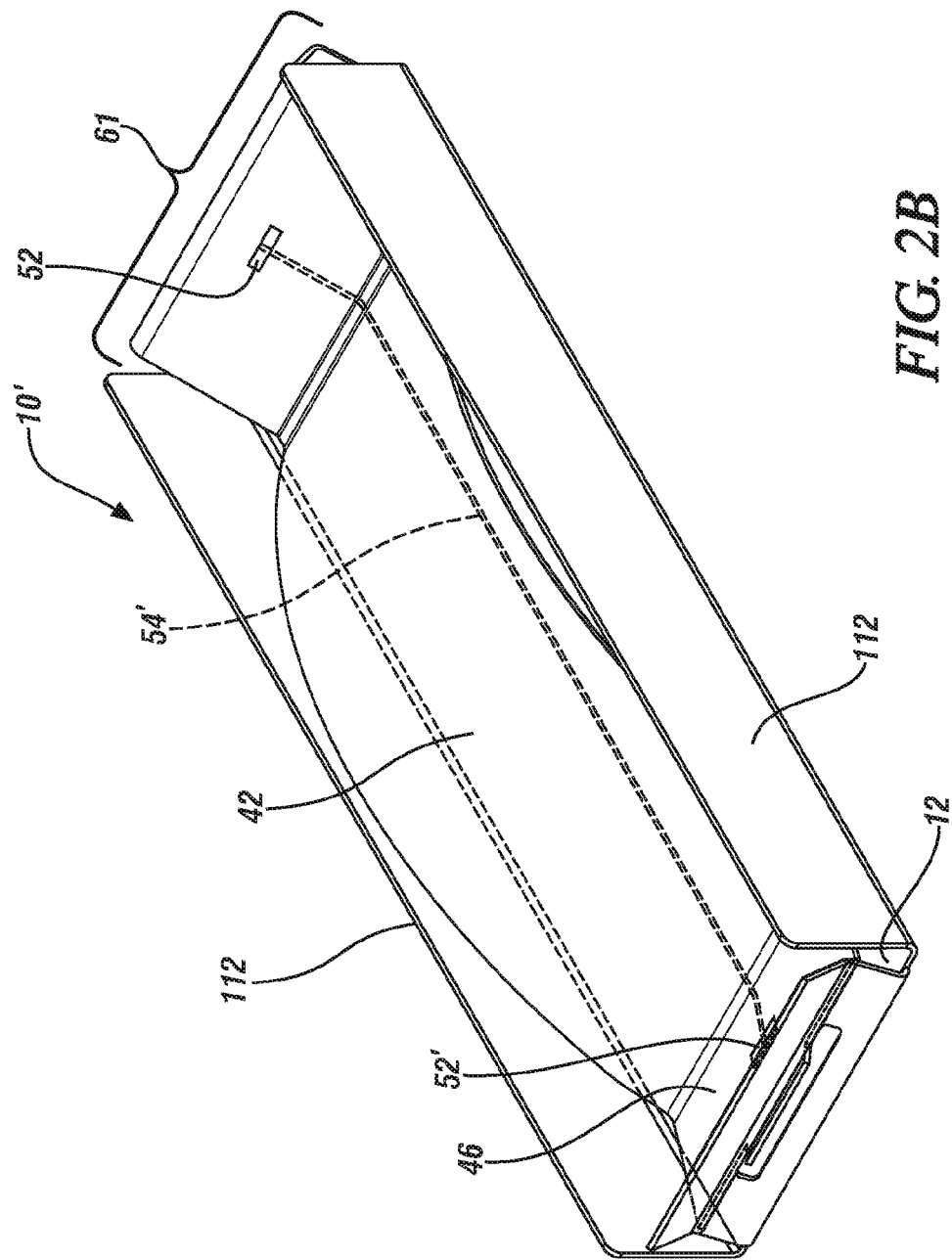
FIG. 2B shows in perspective view an alternative baseplate embodiment incorporating an upswept shielding portion.

FIG. 2B shows a device with an alternate baseplate embodiment. In this configuration that portion of baseplate 12 outboard of arcuate portion 42 is upswept to form wall 112. Wall 112 may serve to block access of air currents or debris to SMA wire 54' and may offer a more cost-effective solution to overcoming environmental influences than directly-applied coverings 70 and 72.

Base segment 11 may be attached to equipment in any suitable manner. This may include mechanical attachment such as bolting and clamping or adhesive bonding. Commonly clamping using C-clamps or hose clamps or adhesive bonding is preferred since no modification of the machine or equipment is required and they permit ready removal.

The selected attachment methods should enable good heat transfer from the equipment to the baseplate of the device. Thus the approach should at least ensure that the equipment surface contacts the base segment of the device at least over that portion of the baseplate in contact with the SMA wire. Thermal communication between the device and the equipment may be enhanced by the addition of a thermal grease or similar material and may be required where the equipment surface is sufficiently rough as to limit the contact area. When adhesive attachment is employed, only high thermal conductivity adhesive tape should be used. Generally a thin tape will be used to enhance thermal conductivity but where surface roughness is an issue the use of a thicker, more compliant mounting tape may be required to maintain intimate thermal contact over the entire equipment surface.

It will be appreciated that the local machine or equipment temperature will be changed by the application of the device and appropriate adjustment of SMA transformation temperature should be made to reflect this change. As an example, the recorded temperature of the casing of a particular machine was increased by about 2.5° C. higher when the device was applied. Where adhesive is used to secure the device to a machine the adhesive should have high thermal conductivity. Some commercially-available double-sided tapes developed for use by the electronics industry may be suitable FIG. 3A shows, in longitudinal section, a second embodiment in which the SMA wire is positioned under base segment 12' in an enclosed channel, channel 13, shown in transverse section in FIGS. 3B and 3C. In such location SMA wire 54, that is, in its high temperature austenite state, is secured to base segment 12' at one end 64 and to flat segment 26 of post segment 21 at second end 66. Protrusion 62 is optional but serves to better orient the force resulting from the contraction associated with transformation of the SMA wire to pivot post segment 21 about bend 18 to release tab 48 from slot 22 and enable arcuate segment 41 to adopt its elevated, flag-visible position.

As shown in FIG. 3B, in one embodiment SMA wire 54 is mounted in channel 13, in contact with base segment 12' but out of contact with the equipment surface. Such a configuration may simplify manufacturing but require determining a correlation between the equipment surface temperature and the SMA wire temperature. If direct contact between SMA wire 54 and the machine surface is required, the shape of channel 13 may be adjusted at two or three locations to include a convex down protrusion, or generally spherical downward-facing dimple, 113 as shown at FIG. 3C and in FIG. 3A. Protrusions 113 serve to support wire 54 and to displace it away from contact with channel 13 and into contact with the machine surface. Protrusions 113 may include shallow notches or similar features, not shown, to fix the transverse location of the wire.

Practices of the invention have been described using certain illustrative examples, but the scope of the invention is not limited to such illustrative examples.

The invention claimed is:

1. A reusable device for placement in thermal communication with a machine, the device serving to detect and give notice of an overheating condition in the machine when the machine is operating or has been operating; the device comprising:
    a unitary sheet metal body formed of a metal sheet having a spring temper and bent at multiple locations to create a shaped multi-segment body, the body comprising a base segment, the base segment being adapted for surface to surface contact with the machine;
    a shape memory alloy (SMA) wire which undergoes a transformation from martensite to austenite and a shape change when it is heated to a predetermined temperature, indicative of an overheating condition in a machine, the SMA wire having first and second ends and being suitably secured at its ends to the shaped sheet metal body so as to position the SMA wire in thermal communication with the machine; and the sheet metal body further comprising
    a flexible arcuate segment with a flag-member, the flexible arcuate segment being connected to the base segment by a torsionable hinge portion, the flag-member having a surface area for displaying a visible indication of overheating in the machine, the arcuate segment being maintained in a stored position in the device when the machine has not experienced an overheating condition, the flag-member being hidden from view when the arcuate segment is in its stored position, the arcuate segment being releaseable from its stored position by activation of the SMA wire when the SMA wire is heated to its predetermined temperature by thermal communication with the machine and experiences its shape change so that the arcuate segment, once released from its stored position pivots about the torsionable hinge portion to bring the flag-member into a viewable position;
    the device being resettable, so that the released arcuate segment may be repositioned into its stored position enabling the device to again detect and give notice of an overheating condition in the machine.

2. The device as recited in claim 1 in which the SMA wire is in thermal conduction contact with the base segment of the body when the arcuate segment is in its stored position.

3. The device as recited in claim 1 in which the unitary sheet metal body hinge portion is adapted to serve as a torsion spring such that the hinge portion is under torsion when the flag-member is in its stored position and is not under torsion when the flag-member is in its alarm giving position.

4. The device as recited in claim 1 in which the base segment of the unitary sheet metal body has opposing ends, and is connected at a first end to a generally upstanding post segment comprising a slot, and, at a second end, the base segment is connected through the torsionable hinge portion to an end of the flexible arcuate segment and its flag-member, the arcuate segment having a tab at an opposing end, the tab being adapted for engagement with the slot of the post segment, the arcuate segment overlying the base section, the arcuate segment being suitably flexible and the hinge portion being suitably torsionable that the arcuate segment may be suitably deformed and the hinge may be suitably torsioned to enable the tab to engage the slot and so form the body into a closed arrangement in which the flag-member is not exposed to view.

5. The device as recited in claim 4 in which the first end of the SMA wire is attached to the arcuate segment and the second end is attached to the hinge portion of the body.

6. The device as recited in claim 4 in which the first end of the SMA wire is attached to the base segment and the second end is attached to the post segment.

7. The device as recited in claim 4 in which the SMA wire has a length selected to assure that the contraction of the wire resulting from its transformation from martensite to austenite enables relative motion of the slot and the tab sufficient to disengage the tab of the arcuate segment from the slot of the post segment so that the torsioned hinge and deformed arcuate segment cooperate to elevate the arcuate segment and expose the flag-member to view.

8. The device as recited in claim 1 in which the unitary sheet metal body is formed from a sheet with a spring temper.

9. The device as recited in claim 8 in which the sheet has a thickness ranging from about 200 micrometers to about 800 micrometers.

10. The device as recited in claim 8 in which the sheet is one of the group consisting of a medium carbon steel alloy, a stainless steel alloy, a titanium alloy and phosphor bronze.

11. The device as recited in claim 1 in which the base segment of the body comprises one or more of ridges, ribs and slots to manage the stiffness of the base segment and promote secure attachment of the device to the machine.

12. The device as recited in claim 1, further comprising a covering or shield positioned to minimize environmental influences on the SMA wire.

13. The device as recited in claim 1 in which the SMA wire undergoes transformation from martensite to austenite within the temperature range 50° C. to 100° C.

14. The device as recited in claim 1 in which the SMA wire consists essentially of a binary alloy of Ni and Ti or a ternary or quaternary alloy consisting essentially of Ni and Ti with one or more of Fe, V, Mn, Co, Cu, Zr, Nb, Mo, Pd, Ag, Hf, Ta, W, Re, Pt.

15. A device for placement on a machine for the purpose of detecting an overheating condition during operation of the machine, the device being in a closed position during normal machine operation and movable to an open position for indication of the overheating condition, the device comprising:
 a multi-segment, flexible, bent-shaped, sheet metal member and a shape memory alloy wire attached to a segment of the bent-shaped sheet metal member, the shape memory alloy wire experiencing a metallurgical phase change, when heated to a temperature indicative of the overheating condition, to shorten its length and to thereby release the flexible, bent-shaped, sheet metal member from a closed position such that it self-flexes to an open position in which the sheet member then indicates an overheating condition of the machine.

16. The device recited in claim 15 in which the sheet metal member is a unitary body.

17. The device recited in claim 15 in which the sheet metal member is an assembly of a plurality of sheet metal components.

18. The device recited in claim 15 in which the, multi-segment, flexible, bent-shaped, sheet metal member is characterized by a plurality of flexible sheet metal segments connected by generally parallel bends formed in a flat strip of sheet metal with a generally rectangular section.

19. The device recited in claim 15 in which the segments of the, multi-segment, flexible, bent-shaped, sheet metal member are further characterized by a generally rectangular base segment for placement on a surface of a machine, the rectangular base segment having two opposing ends and two opposing sides.

20. The device recited in claim 18 in which the, multi-segment, flexible, bent-shaped, sheet metal member comprises a post segment extending across one end of the rectangular base segment, flexibly bent in an upstanding position with respect to the adjoining rectangular base segment, the post segment having a slot extending parallel to the one end of the rectangular base segment;
 an arcuate segment, the arcuate segment being generally rectangular in plan-view with two ends that are generally parallel to the ends of the rectangular base segment, the arcuate segment further being sized and shaped to overlie a major portion of the rectangular base segment with its arcuate segment extending away from the base segment;
 a temperature flag segment at one end of the arcuate segment and bent such that it extends away from the base segment, the temperature flag segment having a tab for insertion into the slot on the post segment;
 a hinge segment flexibly connecting an end of the arcuate segment to an end of the base segment such that the ends of the arcuate segment may be placed against the surface of the base member opposite to its machine contacting surface, and the tab on the temperature flag segment inserted into the slot on the post segment to hold the unitary sheet metal member in its closed position for detecting an overheating condition; and the device further comprising
 the shape memory alloy wire with one end attached to one end of the arcuate segment and the other wire end attached to the other end of the arcuate segment, the shape memory alloy wire being placed against the surface of the base segment when the sheet metal member is in its closed position such that heat transferred into the base segment from a machine is conducted into the shape memory alloy wire.

21. The device as recited in claim 15 in which the SMA wire undergoes transformation from martensite to austenite within the temperature range of about 50° C. to 100° C.

22. The device as recited in claim 15 in which the SMA wire comprises nickel and titanium.

23. The device as recited in claim 15, further comprising an alarm-giving electric circuit and a sensor, the sensor being adapted to detect operation of the device and trigger operation of the alarm-giving electric circuit when an overheating condition is detected.

24. The device as recited in claim 15, the device being adapted for placement on equipment and to promote thermal communication between the device and the equipment.

25. The device as recited in claim 15 further comprising thermally conductive adhesive tape for attachment to equipment.

26. The device recited in claim 15 in which the device enables restoration of the open-positioned flexible, bent-shaped sheet metal member indicative of an overheating condition of a machine to its closed, overheating-detecting position so that the device may be re-used.

* * * * *